US008579484B2

(12) United States Patent
Sugie

(10) Patent No.: US 8,579,484 B2
(45) Date of Patent: Nov. 12, 2013

(54) VEHICLE LIGHTING DEVICE

(71) Applicant: Ichikoh Industries, Ltd., Isehara (JP)

(72) Inventor: Yoshihiro Sugie, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 0 days.

(21) Appl. No.: 13/622,776

(22) Filed: Sep. 19, 2012

(65) Prior Publication Data

US 2013/0070469 A1 Mar. 21, 2013

(30) Foreign Application Priority Data

Sep. 20, 2011 (JP) ................................ 2011-205149

(51) Int. Cl.
*F21V 7/00* (2006.01)
*F21V 29/00* (2006.01)
*F21V 7/22* (2006.01)
*B60Q 1/00* (2006.01)

(52) U.S. Cl.
USPC ............ 362/516; 362/539; 362/547; 362/294

(58) Field of Classification Search
USPC .......... 362/294, 373, 547, 538, 539, 516, 517
See application file for complete search history.

(56) References Cited

U.S. PATENT DOCUMENTS

| | | | | |
|---|---|---|---|---|
| 7,794,126 | B2 | 9/2010 | Ishida et al. | |
| 8,235,570 | B2 * | 8/2012 | Okubo et al. | 362/539 |
| 2007/0268717 | A1 * | 11/2007 | Iwasaki | 362/539 |
| 2008/0225541 | A1 | 9/2008 | Ishida et al. | |
| 2010/0177525 | A1 * | 7/2010 | Iwasaki | 362/517 |
| 2010/0246205 | A1 | 9/2010 | Tanaka et al. | |

FOREIGN PATENT DOCUMENTS

| | | | |
|---|---|---|---|
| DE | 10 2008 011 647 | A1 | 9/2008 |
| EP | 2 484 553 | A2 | 8/2012 |
| FR | 2 611 859 | A1 | 9/1988 |
| JP | 06-203612 | A | 7/1994 |
| JP | 2001-135107 | A | 5/2001 |
| JP | 2008-041558 | A | 2/2008 |
| JP | 2010-061841 | A | 3/2010 |

* cited by examiner

*Primary Examiner* — Thomas Sember
(74) *Attorney, Agent, or Firm* — Foley & Lardner LLP

(57) ABSTRACT

The vehicle lighting device includes a heat sink, a light emitting element, a reflection plate, and a light leakage processing plate. The light leakage processing plate is disposed at a peripheral edge part on a side of the first direction of the reflection plate, and is configured so as to scatter light leakage that is not reflected on the reflection plate from among beams of the light from the light emitting element. The light leakage processing plate is disposed so as to have a gap T with respect to the peripheral edge part of the reflection plate, and is configured so as to be extended over the peripheral edge part of the reflection plate on a side of the second direction and on a side of an opposite direction to the second direction.

4 Claims, 6 Drawing Sheets

VEHICLE LIGHTING DEVICE

CROSS REFERENCE TO RELATED APPLICATIONS

This application claims priority of Japanese Patent Application No. 2011-205149 filed on Sep. 20, 2011. The contents of the application are incorporated herein by reference in their entirety.

BACKGROUND OF THE INVENTION

1. Field of the Invention

The present invention is directed to a vehicle lighting device. In particular, the present invention relates to a vehicle lighting device in which a light emitting element is employed as a light source.

2. Description of the Related Art

As a vehicle lighting device of such type, for example, it has been conventionally known that: a vehicle lighting device is made of a heat sink, a light emitting element, and a reflection surface; in a region of a flat surface of the heat sink, the light emitting element is mounted so that light from a light emission surface thereof is emitted in a first direction that crosses the flat surface; and the light from the light emitting element is reflected and then the reflected light is emitted in a second direction that crosses the first direction (see Japanese Unexamined Patent Application Publication No. 2008-41558).

In addition, it has also been conventionally known that a vehicle lighting device is provided in such a manner that: on the reflection plate, at a peripheral edge portion on the side of the first direction, a portion referred to as a so called erected wall is formed integrally with the reflection plate; and by means of this erected wall, light leakage that is not reflected on the reflection plate, from among beams of the light from the light emitting element, is shaded or scattered (refer to Japanese Patent Application Publication No. 6-203612).

In the following description, the erected wall is referred to as a light leakage processing plate, based on the above described function.

As other documents associated with the present invention, for example, there are exemplified Japanese Unexamined Patent Application Publication No. 2010-61841 and Japanese Unexamined Patent Application Publication No. 2001-135107. In Japanese Unexamined Patent Application Publication No. 2010-61841, there is disclosed a technique in which a rib that is formed in a reflector made of a reflection plate is engaged with a rib that is formed in a housing, whereby positioning of the reflector has been achieved. In addition, in Japanese Unexamined Patent Application Publication No. 2001-135107, there is disclosed a technique in which at an outside of an opening end of the reflector, surface processing such as reflection processing is applied to a portion that is visualized in a surface processing range of an extension portion of an inner panel, whereby its related appearance has been improved.

However, in the vehicle lighting device described above, a reflection plate and a light leakage processing plate are integrally configured with each other, as described above; and therefore, in a case where the reflection plate is formed of a metal or the like, for example, the light leakage processing plate must also be formed of a same kind of metal, and for example, there has been an inconvenience that a total weight of the reflection plate increases.

In addition, even if the reflection plate is reduced in thickness, for example, by virtue of a similar reason, there has been an inconvenience that a certain limitation is applied to reduction of the reflection plate in thickness by the presence of the light leakage processing plate. The light leakage processing plate is formed in the shape of a prism or the like for scattering light on its surface; and therefore, a thickness of this plate comparatively increases and concurrently a thickness of the reflection plate also inevitably increases in order to maintain a mechanical strength.

Further, the vehicle lighting device described above has entailed an inconvenience insofar that the reflection plate and the light leakage processing plate are integrally configured with each other, whereby with respect to the light from the reflection plate, at its related periphery, light from the light leakage processing plate is incident to its appropriate portion; and therefore, a boundary with the light leakage processing plate become unclear (becomes opaque without a difference in brightness), and is visually seen as if the boundary were coming down against the background with respect to its related periphery. Such an inconvenience is observed similarly irrespective of whether or not the vehicle lighting device is lit.

The present invention has been made in view of such a circumstance, and it is an object of the present invention to provide a vehicle lighting device in which one restriction and another are not applied to a reflection plate and a light leakage processing plate, respectively; constructions based on their unique functions can be made; and light that is reflected by means of the reflection plate has a difference in brightness against the background with respect to its related periphery irrespective of whether or not a light source is lit, and the reflected light has an appearance as if it were coming up against the background with respect to the periphery.

In order to achieve such an object, according to the present invention, a light leakage processing plate and a reflection plate are configured respectively independently, and in a case where a direction of light from a light emitting element, the light being reflected on the reflection plate, is defined to be an A direction; and the light leakage processing plate is disposed so as to have a gap with a peripheral edge part in the A direction of the reflection plate, and is configured so as to be extended over the peripheral edge part of the reflection plate in the side of the A direction and an opposite side to the A direction, respectively. Therefore, the reflection plate and the light leakage processing plate are configured respectively independently; and therefore, they attain an advantageous effect that constructions based on their unique functions can be made without one restriction and another being respectively applied thereto, respectively. In addition, a gap is provided between the reflection plate and the light leakage processing plate; and therefore, the light that is reflected by means of the reflection plate has a difference in brightness against the background with respect to its related periphery, and has an advantageous effect as if the reflected light were coming up against the background with respect to the periphery.

SUMMARY OF THE INVENTION

The present invention will be understood by the following configuration.

(1) A vehicle lighting device comprising at least a heat sink, a light emitting element, a reflection plate, and a light leakage processing plate, wherein:

the heat sink is formed so as to have a flat face, the light emitting element is mounted in a region of the flat face of the heat sink so that light from a light emission surface thereof is emitted in a first direction that crosses the flat face, the reflection plate is disposed so as to cover the flat face of the heat sink, and light from the light emitting element is reflected and then the reflected light is emitted in a second direction that crosses the first direction, the light leakage processing plate is disposed at a peripheral edge part on a side of the first direction of the reflection plate, and is configured so as to scatter light leakage that is not reflected on the reflection plate from among beams of the light from the light emitting element, and the light leakage processing plate is disposed so as to have a gap with respect to the peripheral edge part of the reflection plate, is extended over the peripheral edge part of the reflection plate on a side of the second direction, and is configured so as to be extended over the peripheral edge part of the reflection plate on a side of an opposite direction to the second direction.

(2) The vehicle lighting device of other aspect according to the present invention, wherein in proximity to a region in which the light emitting element of the heat sink is to be mounted, a shade is mounted for disallowing visualization of the light emitting element or light leakage of a direct light in a case where the shade is visually seen in the second direction.

(3) The vehicle lighting device of other aspect according to the present invention, wherein on the light leakage processing plate, a rib that protrudes on a side of the heat sink is provided at an extension portion that is extended over the peripheral edge part of the reflection plate in an opposite direction to the second direction.

(4) The vehicle lighting device of other aspect according to the present invention, wherein the light leakage processing plate is made of a material of which a specific gravity is smaller than a specific gravity of the reflection plate.

According to the vehicle lighting device having the above described configuration, a reflection plate and a light leakage processing plate can be configured based on their unique function without one restriction and another being respectively applied thereto, respectively, and irrespective of whether or not a light source is lit, the light that is reflected by means of the refection plate has a difference in brightness against the background with respect to its related periphery, and has an appearance as if the reflected light were coming up against the background with respect to the periphery.

DESCRIPTION OF THE PREFERRED EMBODIMENTS

Figure 1:
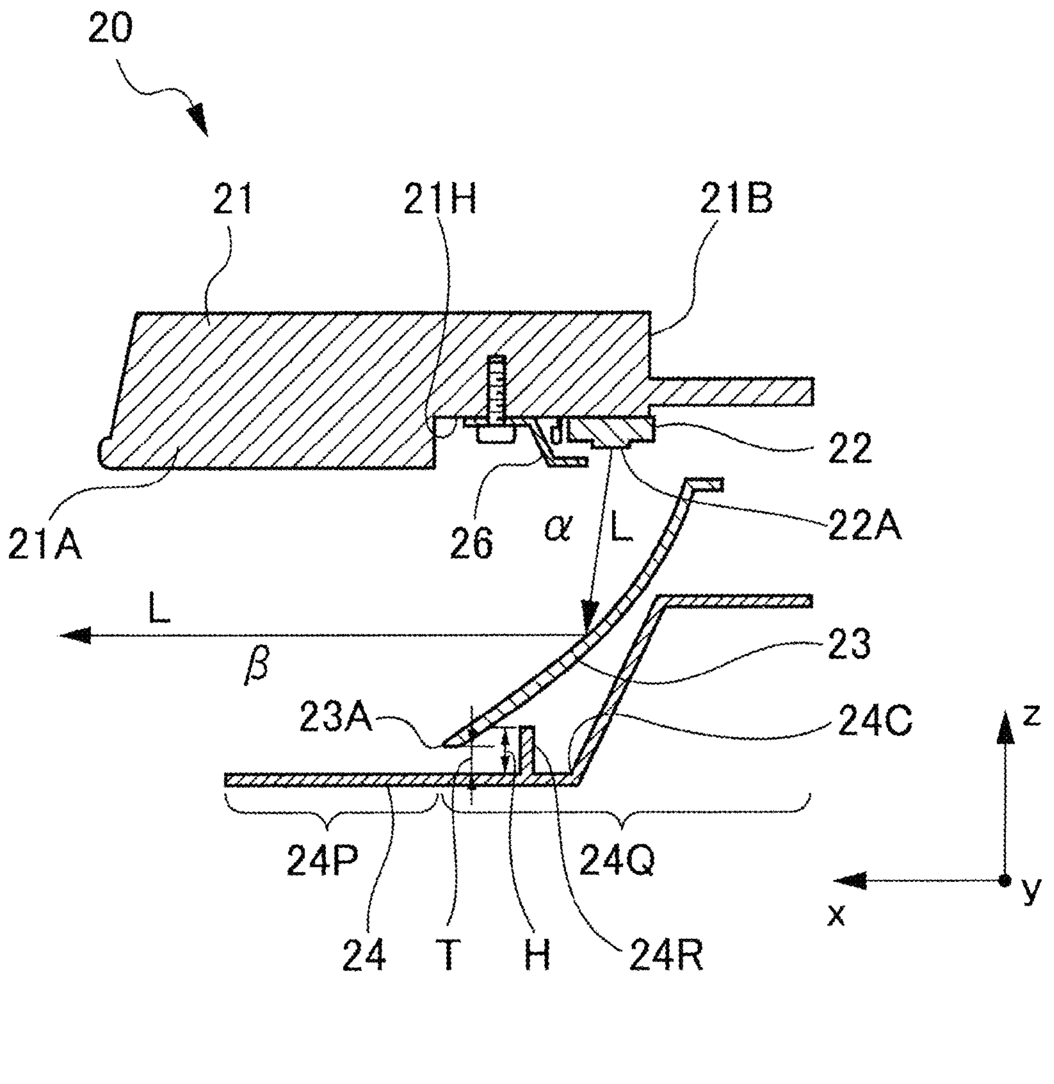
FIG. 1 is a sectional view showing a lamp that is included in a vehicle lighting device according to a first embodiment of the present invention.

Hereinafter, mode for carrying out the present invention (hereinafter, referred to the embodiments) will be described in detail with reference to the drawings. It is to be noted that through the description of the embodiments, same constituent elements are designated by same reference numerals.

First Embodiment

Figure 2:
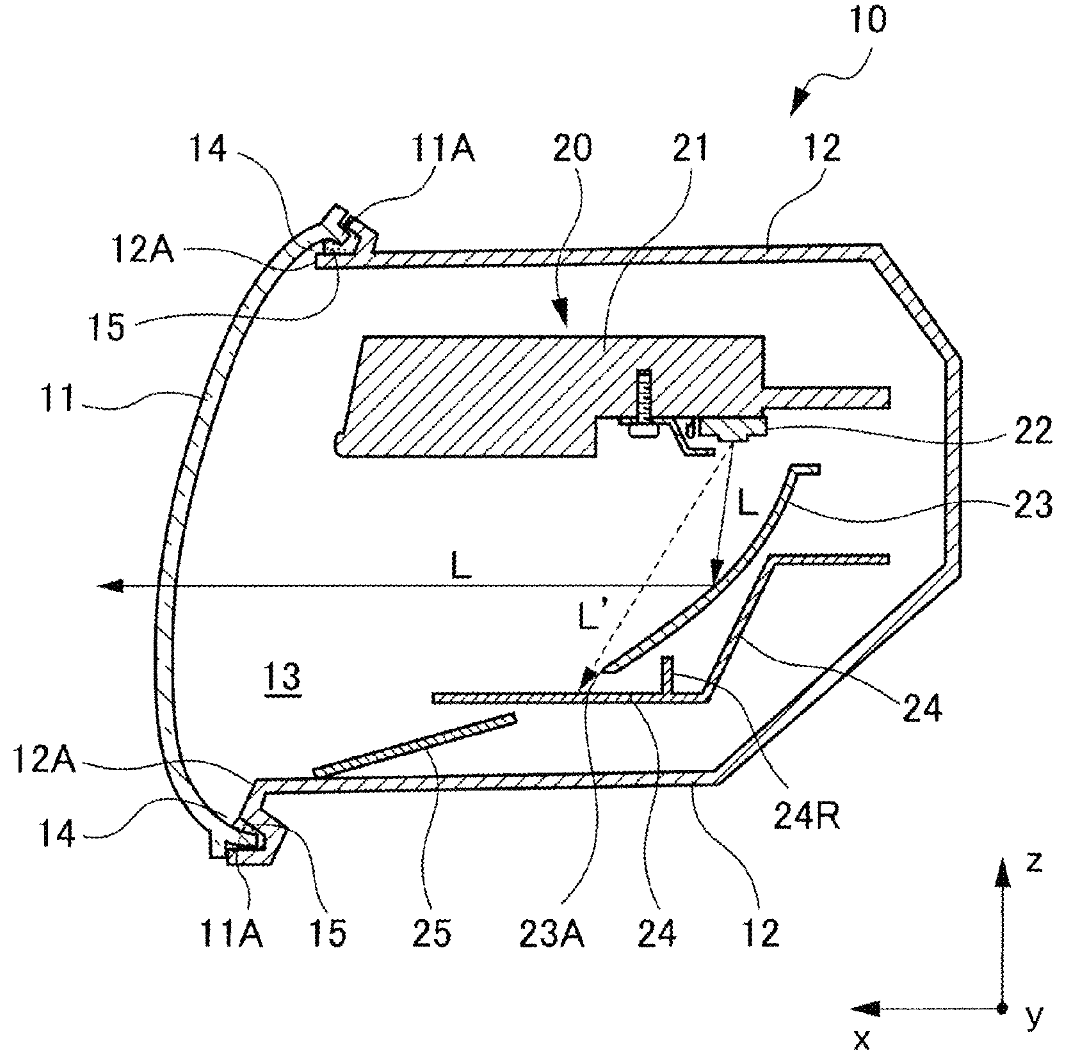
FIG. 2 is a sectional view showing the entirety of the vehicle lighting device according to the first embodiment of the present invention.

FIG. 2 is a sectional view schematically depicting a vehicle lighting device according to a first embodiment of the present invention. A vehicle lighting device 10 shown in FIG. 2 indicates a front lamp (a headlamp), for example. The x-, y-, and z-directions in FIG. 2 respectively indicate a forward direction, a widthwise direction, and a vertical direction of a vehicle in a case where the vehicle lighting device 10 is mounted on the vehicle.

In FIG. 2, in the vehicle lighting device 10, a lamp room 13 is defined by a front lens 11 and a housing 12. The housing 12 has an opening 12A in a front part of the vehicle, and in an edge of the opening 12A, a groove portion 14 is formed in such a manner that a peripheral edge part 11A of the front lens 11 is to be inserted. A hot melt 15 is applied to the groove portion 14 of the housing 12, and by means of this hot melt 15, the peripheral edge part 11A of the front lens 11 is securely fixed, and a sealing property of preventing the entry of moisture can be ensured.

In the lamp room 13 of the vehicle lighting device 10, a lamp 20 is arranged. This lamp 20 is generally made of: a heat sink 21, a light emitting diode (a light emitting element) 22 that is mounted on this heat sink 21; a reflection plate 23 adapted to reflect light L from the light emitting diode 22 and then emit the reflected light to the side of the front lens 11; and a light leakage processing plate 24 that is disposed in proximity to a peripheral edge part 23A on the side of the front lens 11 of the reflection plate 23, and is formed to be extended to a rear of the reflection plate 23. The light leakage processing plate 24 is configured so as to be independent of the reflection plate 23, and is configured in a state in which surface processing is applied such that light leakage that is not reflected on the reflection plate 23 (indicated by reference code L' in FIG. 2), from among beams of the light from the light emitting diode 22. It is to be noted that between the lamp 20 and the housing 12 thus configured, an inner panel 25 is disposed so as to close a gap therebetween, and by means of this inner panel 25, a rear part of the lamp 20 is disallowed from being visually seen.

Figure 3:
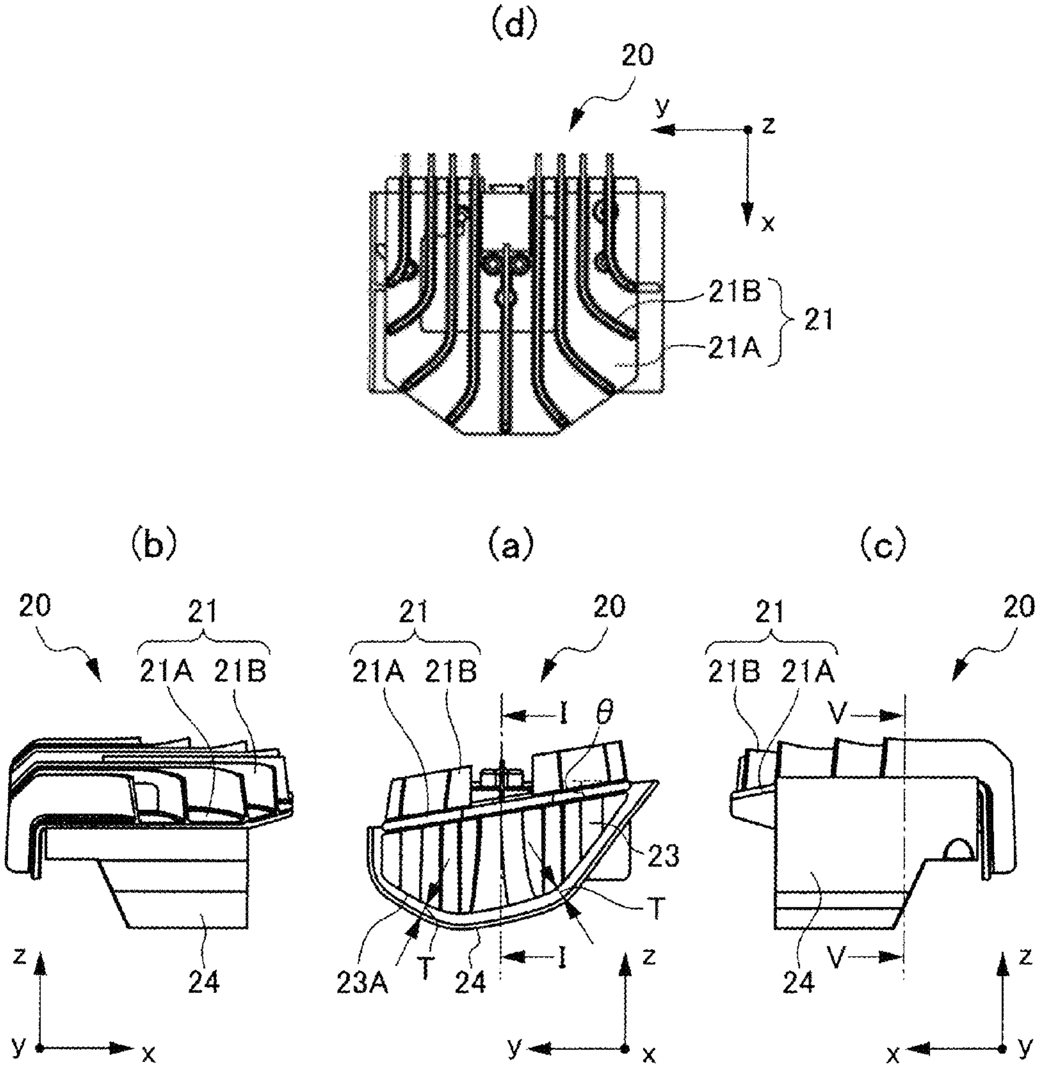
FIG. 3 is a front view, a left side view, a right side view, and a top view showing the lamp that is included in the vehicle lighting device according to the first embodiment of the present invention.

FIG. 3 (*a*), FIG. 3 (*b*), FIG. 3 (*c*), and FIG. 3 (*d*) are structural views showing details on the lamp 20 described above. FIG. 3 (*a*) is a front view; FIG. 3 (*b*) is a left side view; FIG. 3 (*c*) is a right side view; and FIG. 3 (*d*) is a top view. The x-, y-, and z-directions shown in FIG. 3 correspondently indicate the x-, y-, and z-directions shown in FIG. 2, respectively, and this is true for other figures subsequent to FIG. 3 (*a*) to FIG. 3 (*d*).

In FIG. 3 (*a*), FIG. 3 (*b*), FIG. 3 (*c*), and FIG. 3 (*d*), first, the heat sink 21 is disposed at an upper part of the lamp 20. The heat sink 21 is made of: a plate-shaped heat radiation material 21A that has a tilt at an angle θ in the y-direction in the figure with respect to an x-y plane in the figure; and a heat radiation fin 21B that is formed on a top face of the plate-shaped heat radiation material 21A.

Figure 4:
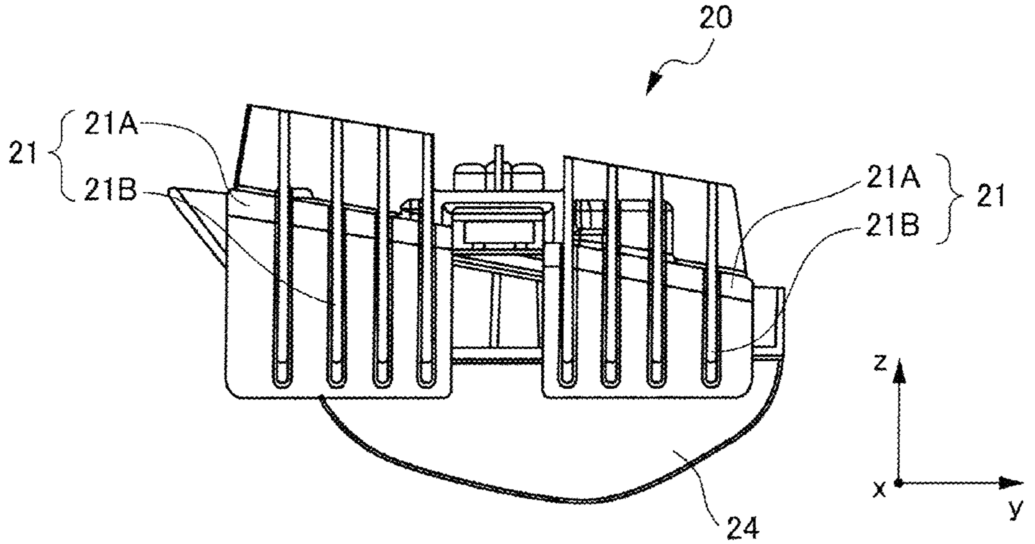
FIG. 4 is a rear view of the lamp that is included in the vehicle lighting device according to the first embodiment of the present invention.

The plate-shaped heat radiation material 21A, from the viewpoint of design, for example, is disposed so as to tilt to be low inside of a vehicle (on the left side in FIG. 1 (*a*)), for example, and so as to tilt to be high outside of the vehicle (on the right side in FIG. 1 (*a*)). The plate-shaped heat radiation material 21A is configured to have a comparatively large area so as to configure a part of an outer frame of the lamp 20. A plurality of heat radiation fins 21B are provided; are provided in parallel to each other in the y-direction in the figure, for example, and are formed to be extended in the x-direction in the figure. In addition, the heat radiation fins 21B, as shown in FIG. 4 that is a rear view of the lamp 20, for example, are configured so as to be bent and extended to a lower side at a rear end part of the plate-shaped heat radiation material 21A, whereby a surface area of the heat radiation fin 21B is increased, and improvement of a heat radiation effect is achieved.

A bottom face of the plate-shaped heat radiation material 21A is formed as a flat face which does not include the heat radiation fin 21B, and as shown in FIG. 1 that is a sectional view taken along the line I-I of FIG. 3 (*a*), a light emitting diode 22 is mounted at a rear end part of the bottom face and in a region at a substantial center in the y-direction in the figure. The light emitting diode 22 is made of a chip-shaped semiconductor element, and at a part of the main surface, a light emission region 22A is formed. The light emitting diode 22 is disposed so that the light emission region 22A becomes low with respect to the bottom face of the plate-shaped heat radiation material 21A, whereby light L from the light emission region 22A of the light emitting diode 22 is emitted to the lower side in the figure (in the direction indicated by the arrow α in the figure: In this specification, this direction may be referred to as a first direction). In addition, as shown in FIG. 1, in the lower surface of the plate-shaped heat radiation material 21A, a recessed portion flat face 21H that has a step with respect to another peripheral flat face is formed at a proximal portion at which the light emitting diode 22 is to be disposed, so as to thereby ensure that the light emitting diode 22 is embedded in and mounted on the recessed portion flat face 21H. Further, in the recessed portion flat face 21H, a shade 26 is mounted on a front side of the vehicle (in the x-direction in the figure) more than the light emitting diode 22, and this shade 26 is disposed so as to cover a front part except for the light emission region 22A of the light emitting diode 22. In this manner, in a case where the lamp 20 is visually seen from a front side, the light emitting diode 22 is disallowed to be visually seen, by means of the shade 26, so as to define a limit in the light emission range on the front side of the light from the light emitting diode 22 (in the x-direction in the figure) and so as to prevent light leakage of a direct light.

On a lower side of the heat sink 21 on which the light emitting diode 22 is thus mounted, a reflection plate 23 is disposed so as to cover the bottom face of the heat sink 21. The reflection plate 23 is made of a metal plate, for example, and has a curved surface that is combined with a rotational parabolic surface or a parabolic columnar surface or the like. This reflection plate is also disposed so as to have a comparatively large opening together with the heat sink 21 in the peripheral edge part 23A of the front part of the lamp 20. In addition, an interior face of which a side is opposite to that of the light emission region 22A of the light emitting diode 22 of the reflection plate 23 is configured with a light reflection surface to which light reflection processing is applied. In this manner, the light from the light emitting diode 22 is reflected by means of the light reflection surface of the reflection plate 23 so as to be emitted to an opening side of the reflection surface 23 (in the direction indicated by the arrow β in the figure: This direction may be referred to as a second direction in this specification). The peripheral edge part 23A on the opening side of the reflection plate 23, as shown in FIG. 3 (*a*), is formed in an asymmetrical shape because the plate-shaped heat radiation material 21A of the heat sink 21 is disposed to tilt in the y-direction in the figure with respect to the x-y plane in the figure, thereby achieving a uniform optical distribution of the reflected light from the reflection plate 23.

Herein, the reflection plate 23 is configured as a reflection plate that has only a function of reflecting the light from the light emitting diode 22 to a front side of a vehicle. In other words, in the peripheral edge part 23A on the front side of the vehicle, the reflection plate 23, as is evident from a conventional configuration, is configured as a reflection plate that does not have a region as an erected wall adapted to shade or scatter light leakage (indicated by reference code L' in FIG. 2) that is not reflected on the reflection plate 23 from among beams of the light from the light emitting diode 22. Thus, there is attained an advantageous effect that the reflection plate 23 can be reduced in thickness in such a range as to permit a mechanical strength without being restricted on a configuration of the erected wall.

In the present invention, a function of an erected wall seen in the related art is carried out by means of a light leakage processing plate 24 that is configured so as to be independent of the reflection plate 23. The light leakage processing plate 24 is made of a synthetic resin, for example. The light leakage processing plate 24 is made of a synthetic resin that is a material of which a specific gravity is smaller than a specific gravity of the reflection plate 23 made of a metal plate, for example, whereby there is attained an advantageous effect that a total weight of the reflection plate 23 and the light leakage processing plate 24 can be configured so as to be smaller than a total weight of the conventional reflection plate and erected wall.

In addition, the light leakage processing plate 24, as shown in FIG. 3 (*a*), is disposed downward of the reflection plate 23, and is disposed so as to have a gap T with respect to the peripheral edge part 23A almost all over the peripheral edge part 23A of the reflection plate 23. A value of the gap T is set to be substantially equal to that of any other gap almost all over the peripheral edge part 23A of the reflection plate 23. The light leakage processing plate 24, as shown in FIG. 1, is configured so as to have an extension portion 24P (that may be referred to as a forward extension portion 24P) that extends over the peripheral edge part 23A of the reflection plate 23 on the side of the forward direction of the vehicle (x-direction in the figure: the second direction). In all or part of a face on the side of the light emitting diode 22 of this forward extension portion 24P, for example, a plurality of prisms or the like are formed so as to be provided in parallel to each other in the y-direction in the figure, and so as to extend in the x-direction in the figure, and by means of these prisms or the like, light leakage that is not reflected by means of the reflection plate from among beams of the light from the light emitting diode is scattered. It is to be noted that, of course, the forward extension portion 24P of the light leakage processing plate 24 may be caused to have a light scattering function as described above, for example, processing may be applied in such a manner as to reduce a light reflection index, or alternatively, processing may be applied in such a manner as to have a light shading function. With such a construction, the reflection plate 23 is disposed so as to have a gap T with respect to the light leakage processing plate 24 in the peripheral edge part 23A, and even if scattering light from the light leakage processing plate 24 exists, there is attained an advantageous effect that the light that is reflected by means of the reflection plate 23 of the light emitting diode 22 is capable of clarifying a difference in brightness against the background with respect to its related periphery, and has an appearance as if the reflected light were coming up against the background with respect to the periphery. Such an advantageous effect can be attained similarly even in the case where the light emitting diode 22 is not lit.

Figure 5:
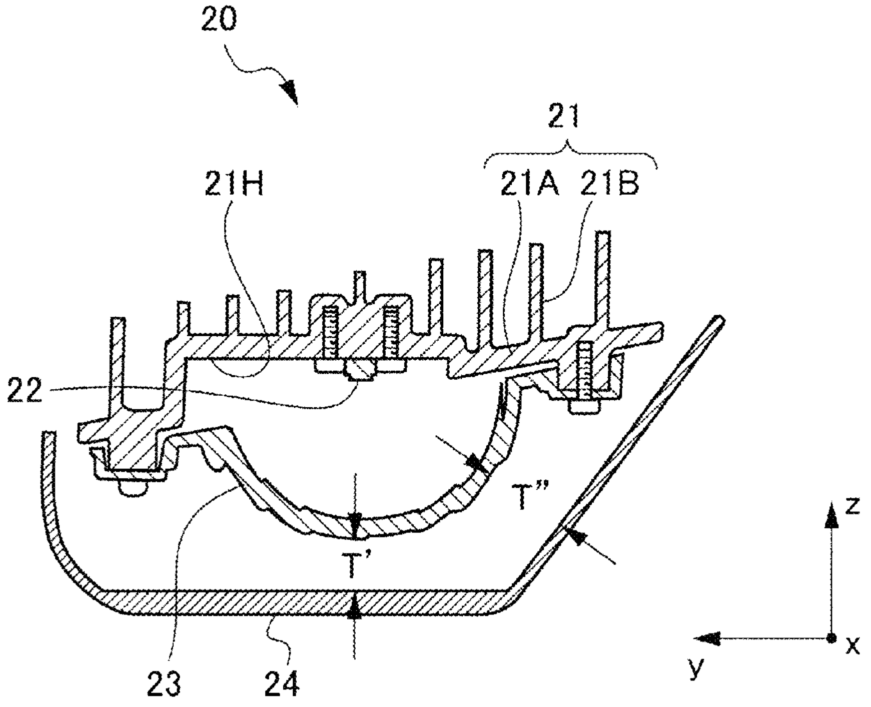
FIG. 5 is a sectional view taken along the line V-V in FIG. 3 (*c*)

Further, the light leakage processing plate 24 is configured in a backward direction of a vehicle (in an opposite direction to the x-direction in the figure) so as to have an extension portion 24Q (that may be referred to as a backward extension portion 24Q) that extends on the side of the heat sink 21 via a bent portion 24C that is bent to the side of the heat sink 21, over the peripheral edge part 23A of the reflection plate 23. An end part of the backward extension portion 24Q is fixed to the heat sink 21 by means of screw as described later. Herein, with respect to the rear part extension portion 24Q of the light leakage processing plate 24, as shown in FIG. 5 that is a sectional view taken along the line V-V of FIG. 3 (*c*), there is no need to set gaps with respect to the reflection plate 23 (indicated by reference codes T', T" or the like in the figure) to be substantially equal to each other, and this extension portion is configured so as to be formed in such a shape as to be able to reliably fixed to the heat sink 21.

Turning to FIG. 1, with respect to the light leakage processing plate 24, in the rear part extension portion 24Q, a rib 24R that protrudes to the side of the heat sink 21 is provided in front of a bent portion 24C. This rib 24R is provided to extend in a widthwise direction of the light leakage processing plate 24 (in the y-direction in the figure), and its related height H is set at a value that is greater than that of the gap T between the peripheral edge part 23A of the reflection plate 23 and the light leakage processing plate 24. In this manner, in a case where the lamp 20 is visually seen in the forward direction of a vehicle, a rear part on the side of the bent portion 24C of the light leakage processing plate 24 is disallowed from being visually seen, by means of the rib 24R. It is to be noted that there may be no need to provide the bent portion 24C on the light leakage processing plate 24, and in this case also, the rib 24R is formed, thereby making it possible to attain a so called advantageous effect of preventing visualization from a rear side such as an advantageous effect of putting routed wires or the like out of sight from a rear side, for example.

Figure 6:
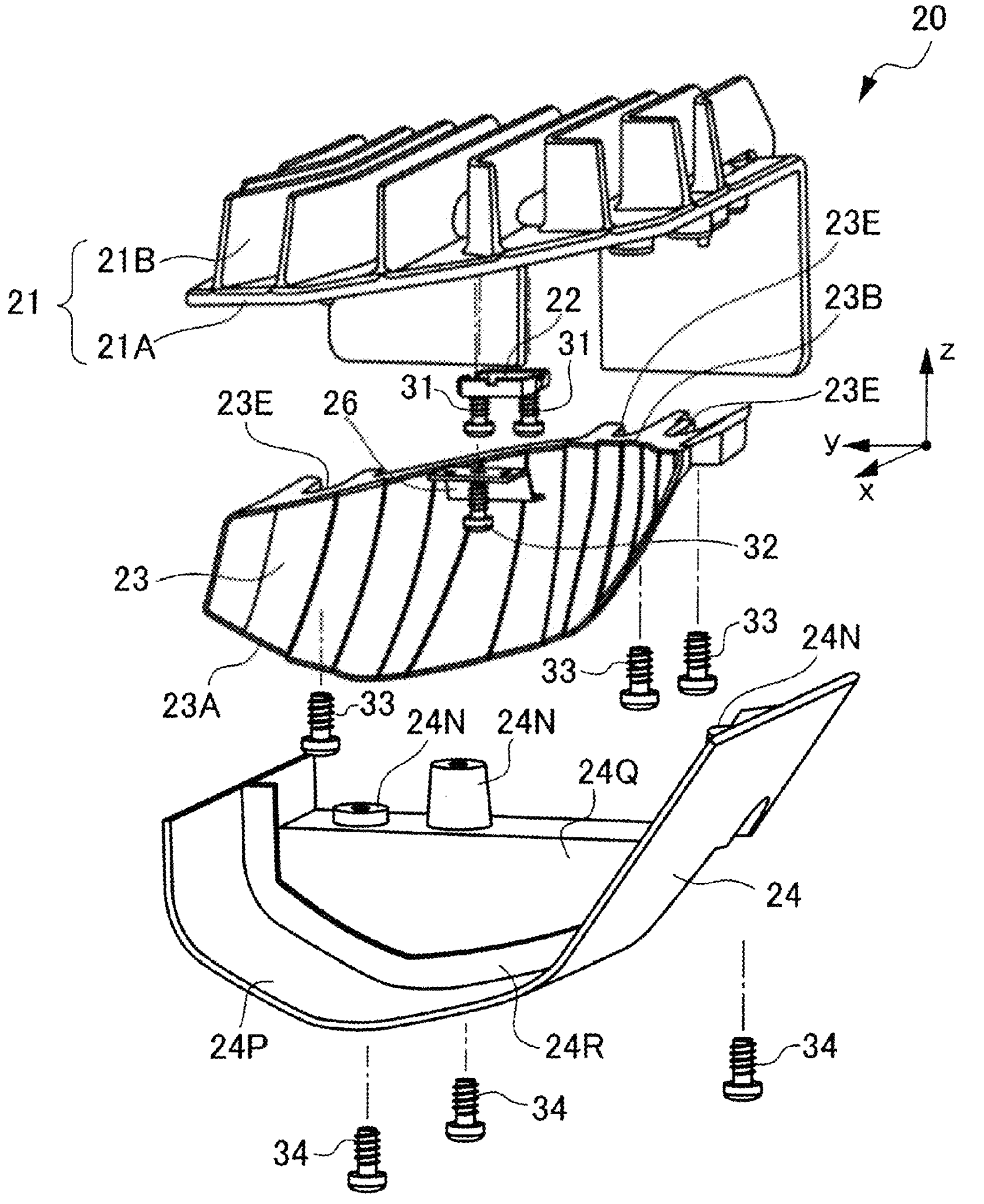
FIG. 6 is an exploded perspective view of the lamp that is included in the vehicle lighting device according to the first embodiment of the present invention.

FIG. 6 is a perspective view showing a state in which the heat sink 21, the light emitting diode 22, the shade 26, the reflection plate 23, and the light leakage processing plate 24, of the lamp 20 described above, are disassembled together with screws 31, 32, 33, and 34.

In FIG. 6, the light emitting diode 22 is adapted so as to be mounted on the plate-shaped heat radiation material 21A of the heat sink 21 by means of two screws 31, for example. The shade 26 is adapted so as to be mounted on the plate-shaped heat radiation material 21A of the heat sink 21 by means of one screw 32, for example. The reflection plate 23 is adapted so as to be mounted on the plate-shaped heat radiation material 21A of the heat sink 21 by means of three screws 33, for example. The reflection plate 23 serves as a portion adapted to abut against the plate-shaped heat radiation material 21A of the heat sink 21 at another peripheral edge part 23B except for the peripheral edge part 23A, and at the peripheral edge part 23B, a cutout 23E is formed in such a manner that the screw 33 is to be inserted. The light leakage processing plate 24 is adapted so as to be mounted on the plate-shaped heat radiation material 21A of the heat sink 21 by means of three screws 34, for example. A portion at which the light leakage processing plate 24 is to be mounted on the plate-shaped heat radiation material 21A is a rear end part of a rear end extension portion 24Q, and at this rear end part, three screw insert cylinders 24N of which heights are sequentially different from each other are provided in parallel in a widthwise direction of the light leakage processing plate 24 (in the y-direction in the figure). The screw insert cylinders 24N each are provided in such a manner that faces of the light leakage processing plate 24 on which these cylinders are to be mounted are in parallel to the x-y pane in the figure, whereas the plate-shaped heat radiation material 21A of the heat sink 21 is disposed so as to have an angle θ in the y-direction in the figure on the x-y plane in the figure (refer to FIG. 3 (*a*)); and therefore, this heat radiation plate_is configured in such a manner that its related heights are different from each other so as to compensate for gaps therebetween. Each screw 34 is inserted into the respective screw insert cylinder 24N so as to be screwed into the plate-shaped heat radiation material 21A of the heat sink 21.

All of these light emitting diodes 22, shade 26, reflection plate 23, and light leakage processing plate 24 can be mounted on the heat sink 21 in one direction (in the z-direction in the figure) by means of the screws 31, 32, 33, and 34; and there is attained an advantageous effect that the lamp 20 can be easily assembled. In addition, the screws 31 and 32 are screwed into a recessed portion flat face 21H of the plate-shaped heat radiation material 21A of the heat sink 21, and the screws 33 and 34 are disposed at a rear part of the reflection plate 23 and then are screwed therein; and therefore, in a case where the lamp 20 is visually seen from a front side, there is attained an advantageous effect that these screws 31, 32, 33, and 34 cannot be visually seen.

In the vehicle lighting device thus configured, the reflection plate 23 and the light leakage processing plate 24 are configured respectively independently; and therefore, constructions based on their unique functions can be made without one restriction from another being respectively applied thereto. In this manner, there can be attained an advantageous effect that the reflection plate 23 can be reduced in thickness, for example, or alternatively, a total weight of the reflection plate 23 and the light leakage processing plate 24 can be reduced. In addition, a gap T is provided between the reflection plate 23 and the light leakage processing plate 24; and therefore, the light that is reflected by means of the reflection plate 23 can be caused to have a difference in brightness against the background with respect to its related periphery irrespective of whether r not the light emitting diode 22 is lit, and can also be caused to have an appearance as if the reflected light were coming up against the background with respect to the periphery.

Second Embodiment

Figure 7:
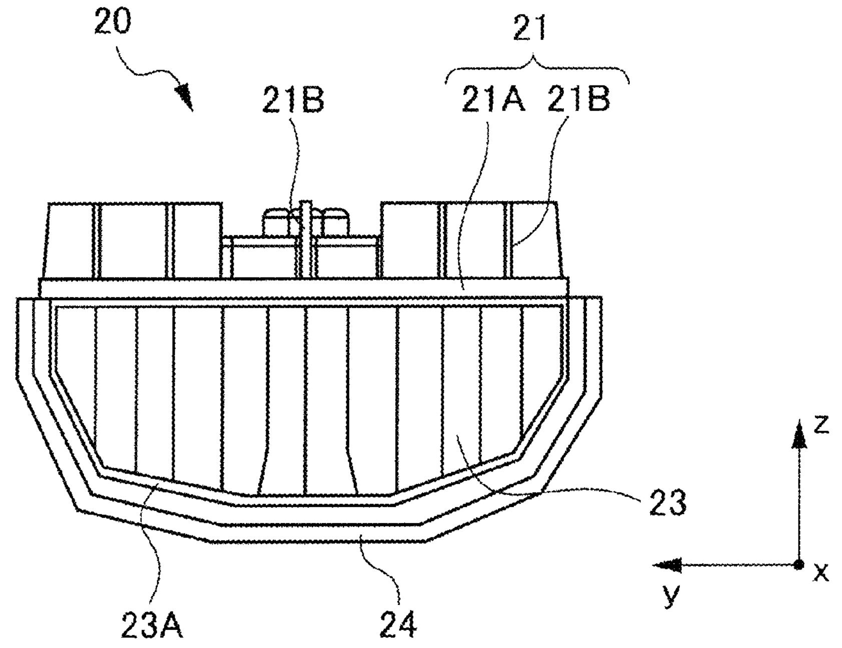
FIG. 7 is a front view showing a lamp that is included in a vehicle lighting device according to a second embodiment of the present invention.

The vehicle lighting device 10 shown in the first embodiment is provided in such a manner that the plate-shaped heat radiation material 21A of the heat sink 21 is disposed so as to have a tilt with respect to a horizontal plane (the x-y plane in the figure). However, without being limitative thereto, for example, as shown in FIG. 7 that is drawn in association with FIG. 3 (*a*), it is a matter of course that the plate-shaped heat radiation material 21A of the heat sink 21 may be disposed so as to be substantially in parallel to a horizontal plane (in the x-y plane in the figure). By doing this also, a similar advantageous effect can be attained.

Third Embodiment

Figure 8:
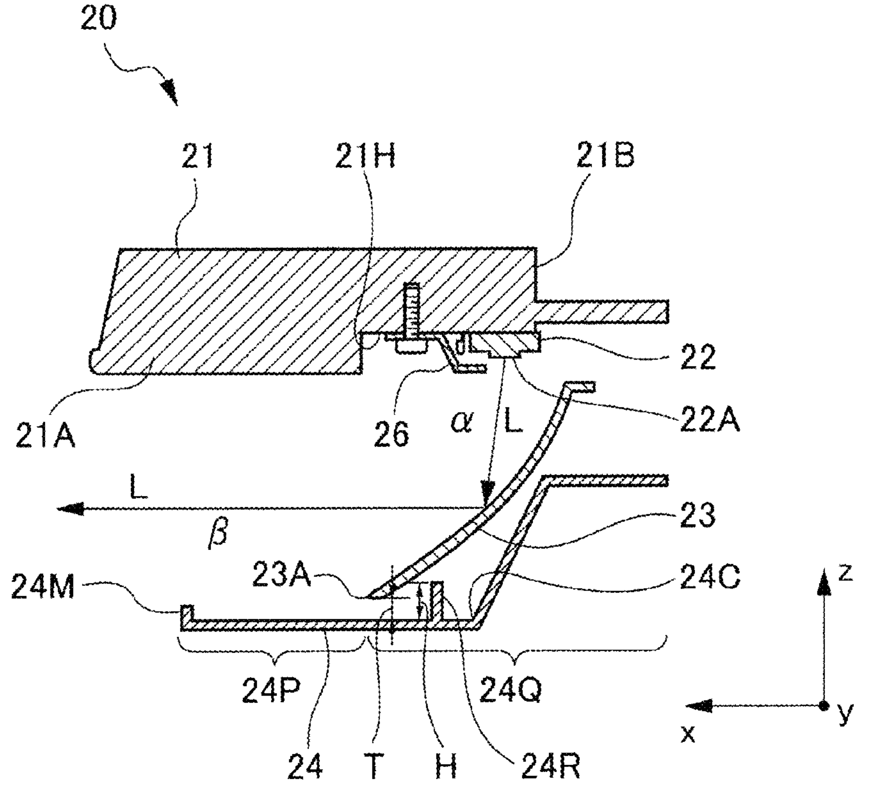
FIG. 8 is a front view showing a lamp that is included in a vehicle lighting device according to a third embodiment of the present invention.

The vehicle lighting device 10 shown in the first embodiment is constructed in such a manner that on the light leakage processing plate 24, an end face in a forward direction of a vehicle (in the x-direction in the figure) is oriented in the forward direction of the vehicle. However, without being limitative thereto, as shown in FIG. 8 that is drawn in association with FIG. 1, a turn-back portion 24M may be provided in such a manner that with respect to an end part in the vehicle forward direction of the light leakage processing plate 24 (in the x-direction in the figure), an end face thereof is oriented to the side of the heat sink 21. In addition, a coating made of a predetermined color may be applied to a side on the side of the vehicle forward direction of this turn-back portion 24M (in the x-direction in the figure). With this construction, a relationship in distance between the reflection plate 23 and the light leakage processing plate 24 becomes clear, and the light that is reflected by means of the reflection plate 23 of the light emitting diode 22 can cause a difference in brightness against the background with respect to its periphery to become more clear and then is caused to have an appearance as if the reflected light were coming up against the background with respect to the periphery.

Fourth Embodiment

The vehicle lighting device 10 shown in the first embodiment were described as to the one in which in the lamp room 13, the heat sink 21 is disposed on an upper side, and the reflection plate 23 and the light leakage processing plate 24 are disposed on a lower side. However, without being limitative thereto, it is needless to say that in the lamp room 13, the reflection plate 23 and the light leakage processing plate 24 may be disposed on an upper side, and the heat sink 21 is disposed on a lower side while their upper and lower dispositions are reversed.

Fifth Embodiment

The lamp 20 shown in the first embodiment is configured with the heat sink 21, the light emitting diode 22, the reflection plate 23, and the light leakage processing plate 24. However, without being limitative thereto, for example, it is needless to say that this lamp may be configured so as to include a driving mechanism such that a light emission angle of the lamp 20 can be changed.

Sixth Embodiment

The vehicle lighting device 10 shown in the first embodiment is shown by way of an example in which the lighting device is employed as a front lamp (a headlamp). However, without being limitative thereto, it is needless to say that this lighting device can be applied to another lamp as well.

While the present invention has been described by way of various embodiments, it is needless to say that the technical scope of the present invention is not limitative to the scope set forth in the foregoing embodiments. It is self-evident to one skilled in the art that various modifications or improvements can occur to the foregoing embodiments. In addition, it is evident from the recitations of the claims that a mode to which such modifications or improvements have occurred can also be encompassed in the technical scope of the present invention.

What is claimed is:

1. A vehicle lighting device comprising at least a heat sink, a light emitting element, a reflection plate, and a light leakage processing plate, wherein:

the heat sink is formed so as to have a flat face, the light emitting element is mounted in a region of the flat face of the heat sink so that light from a light emission surface thereof is emitted in a first direction that crosses the flat face, the reflection plate is disposed so as to cover the flat face of the heat sink, and light from the light emitting element is reflected and then the reflected light is emitted in a second direction that crosses the first direction, the light leakage processing plate is disposed at a peripheral edge part of the reflection plate on a side of the reflection plate opposite a side of the reflection plate facing the light emitting element, and is configured so as to scatter light leakage that is not reflected on the reflection plate from among beams of the light from the light emitting element, and the light leakage processing plate is disposed so as to have a gap with respect to the peripheral edge part of the reflection plate, and extends over the peripheral edge part of the reflection plate along the second direction.

2. The vehicle lighting device according to claim 1, wherein in proximity to a region in which the light emitting element of the heat sink is to be mounted, a shade is mounted for disallowing visualization of the light emitting element or light leakage of a direct light in a case where the shade is visually seen in the second direction.

3. The vehicle lighting device according to claim 1, wherein on the light leakage processing plate, a rib that protrudes on a side of the heat sink is provided at an extension portion that extends over the peripheral edge part of the reflection plate along an opposite direction to the second direction.

4. The vehicle lighting device according to claim 1, wherein the light leakage processing plate is made of a material of which a specific gravity is smaller than a specific gravity of the reflection plate.

* * * * *